US005202914A

United States Patent [19]

Kim et al.

[11] Patent Number: 5,202,914

[45] Date of Patent: Apr. 13, 1993

[54] SYSTEM FOR RESETTING A POSTAGE METER

[75] Inventors: Hyung-Kun (Paul) Kim, Wilton; William V. Pickering, Jr., New Canaan, both of Conn.

[73] Assignee: Pitney Bowes Inc., Stamford, Conn.

[21] Appl. No.: 582,576

[22] Filed: Sep. 13, 1990

[51] Int. Cl.[5] .......... H04M 11/00

[52] U.S. Cl. .......... 379/97; 379/102; 379/104; 379/106; 379/107

[58] Field of Search .......... 379/97, 102, 104, 106, 379/107

[56] References Cited

U.S. PATENT DOCUMENTS

| | | | |
|---|---|---|---|
| 4,097,923 | 6/1978 | Eckert, Jr. et al. | 363/900 |
| 4,122,532 | 10/1978 | Dlugos et al. | 364/900 |
| 4,138,735 | 2/1979 | Alocca et al. | 364/900 |
| 4,447,890 | 5/1984 | Duwel et al. | 364/900 |
| 4,752,950 | 6/1988 | Le Carpentier | 379/102 |
| 4,812,992 | 3/1989 | Storace et al. | 364/464.02 |

FOREIGN PATENT DOCUMENTS

| | | |
|---|---|---|
| 0298776 | 7/1988 | European Pat. Off. . |
| 0315260 | 10/1988 | European Pat. Off. . |
| 2584516 | 6/1985 | France . |
| 2185443 | 12/1986 | United Kingdom . |

*Primary Examiner*—James L. Dwyer
*Assistant Examiner*—Stella L. Woo
*Attorney, Agent, or Firm*—Robert H. Whisker; Melvin J. Scolnick

[57] ABSTRACT

A system for automatically remotely recharging a postage meter. The system includes an integrated circuit microcontroller which establishes communication with existing electronic postage meters to obtain information necessary for automatic recharging using existing remote data processing system for the automatic recharging of postage meters, compiles that information with other information already contained within the system to form a message, transmits that message to the remote data processing system and receives in response a recharging code. The system then transmits the recharging code to the electronic postage meter which in turns test the code and, if the code is found valid, increments the meter descending register to effect the recharge. In one embodiment the system includes a communications unit and a base unit where the base unit is permanently connected to the meter and the communications unit may be separated from the base unit. This embodiments allows one communications unit to be used to recharge a number of meters and also allows the communications unit to be physically transported to a remote telephone line.

19 Claims, 13 Drawing Sheets

FIG. 2B

| LED | ERROR NO. | ERROR DESCRIPTION |
|---|---|---|
| ○ ○ ○ ○ ○ | 0 | SUCCESSFUL RECHARGE; NO ERROR |
| ● ○ ○ ○ ○ | 1 | POWER UP RAM TEST FAIL |
| ○ ● ○ ○ ○ | 2 | POWER UP ROM TEST FAIL |
| ● ● ○ ○ ○ | 3 | POWER UP EEPROM TEST FAIL |
| ○ ○ ● ○ ○ | 4 | POWER UP MODEM LOOPBACK TEST FAIL |
| ● ○ ● ○ ○ | 5 | GENERAL PURPOSE METER COMMUNICATIONS FAIL |
| ○ ● ● ○ ○ | 6 | GENERAL PURPOSE ECHOPLEX DRIVER COMMUNICATIONS FAIL |
| ● ● ● ○ ○ | 7 | GENERAL PURPOSE COMMUNICATIONS PROTOCOL FAIL |
| ○ ○ ○ ● ○ | 8 | GENERAL PURPOSE MODEM PROTOCOL FAIL |
| ● ○ ○ ● ○ | 9 | GENERAL PURPOSE PHYSICAL/LINE FAIL |
| ○ ● ○ ● ○ | 10 | REFILL ERROR; INVALID ACCESS CODE |
| ● ● ○ ● ○ | 11 | METER STATUS RETURNS PROCEDURAL/FATAL ERROR |
| ○ ○ ● ● ○ | 12 | METER DATA FORMATTED IMPROPERLY |
| ● ○ ● ● ○ | 13 | ECHOPLEX DRIVER REPORTS NO NO ERROR PULSE |
| ○ ● ● ● ○ | 14 | ECHOPLEX DRIVER REPORTS OTHER SIDE NOT ECHOING |
| ● ● ● ● ○ | 15 | PHYSICAL LAYER DID NOT DETECT REMOTE MODEM ANSWER TONE |
| ○ ○ ○ ○ ● | 16 | MODEM LAYER CONNECT ESTABLISHMENT FAILURE |
| ● ○ ○ ○ ● | 17 | MODEM LAYER REPORTS LOSS OF CARRIER |
| ○ ● ○ ○ ● | 18 | MODEM LAYER REPORTS TIME-OUT ATTEMPTING TO SEND |
| ● ● ○ ○ ● | 19 | MODEM LAYER REPORTS LAST-TRANSMISSION DATA SENT IS NOT ACKNOWLEDGED BY REMOTE |
| ○ ○ ● ○ ● | 20 | COMBINATION NUMBER IS BEING RE-ISSUED OR PREVIOUS COMBINATION NUMBER WAS NOT ENTERED |
| ● ○ ● ○ ● | 21 | LINK IS DOWN BETWEEN PC AND DATA CENTER COMPUTER |
| ○ ● ● ○ ● | 22 | INVALID STATUS ON CUSTOMER DATABASE OR METER DATABASE |
| ● ● ● ○ ● | 23 | INVALID RMRS ACCOUNT NUMBER OR INVALID METER SERIAL NUMBER |
| ○ ○ ○ ● ● | 24 | RECEIVED SIGNOFF WITH BAD STATUS FORM REMOTE |
| ● ○ ○ ● ● | 25 | CANNOT REFILL WITH SELECTED AMOUNT |
| ○ ● ○ ● ● | 26 | REFILL FAILED BECAUSE METER REJECTED COMBINATION |
| ● ● ○ ● ● | 27 | COMMUNICATIONS PROTOCOL TIME-OUT |
| ○ ○ ● ● ● | 28 | TELEPHONE LINE IS BUSY OR NOT ANSWERED BY REMOTE |
| ● ○ ● ● ● | 29 | MANUAL DIE SELECTED BUT USER FAILED TO WAIT FOR REMOTE CARRIER; NO CARRIER DETECTED TO ESTABLISH CONNECTION |
| ○ ● ● ● ● | 30 | PROBLEM WITH RMRS BLACK BOX OR DATABASE RECORD IS LOCKED |
| ● ● ● ● ● | 31 | RESET AMOUNT WILL EXCEED METER DESCENDING REGISTER |

FIG. 2D

| STATUS \ INDICATOR | ON/ERR | METER | LINE | BUSY | CODE | PB SERVICE | DONE | NO FUNDS |
|---|---|---|---|---|---|---|---|---|
| WEAK BATTERIES | BLINK | | | | | | | |
| LINE ERROR, EG LINE IS OFF HOOK DURING TEST | BLINK | | ON | | | | | |
| MODEM SELF TEST FAILED | BLINK | | | | | ON | | |
| METER COMMUNICATION FAILED | BLINK | ON | | | | | | |
| ALL SELF TESTS OK | ON | | | | | | | |
| COMMUNICATION TO DATA CENTER IN PROGRESS | ON | | | | | | BLINK | |
| COMMUNICATIONS FAILURE | ON | | | | | ON | | |
| NO ANSWER TO TELEPHONE CALL | ON | | ON | | | | | |
| BUSY TELEPHONE LINE | ON | | | ON | | | | |
| RESET CODE RECEIVED | ON | | | | ON | | | |
| NO FUNDS CODE RECEIVED | ON | | | | | | | ON |
| METER DISCONNECTED DURING RESET.REQUEST | ON | BLINK | | | | | | |
| FUNDS RESET COMPLETED | ON | | | | | | ON | |

SYSTEM FOR RESETTING A POSTAGE METER

BACKGROUND OF THE INVENTION

The subject invention relates to a system for recharging postage meters. More particularly, it relates to a system for automatically recharging a postage meter with funds to allow the meter to continue operation.

Postage meters are devices which have found wide application in many business. Such meters are used to frank parcels and mail by printing indicia which are equivalent to postage stamps. Clearly, it is therefor essential that postage meters include a secure mechanism to assure that the meter prints only postage for which the postal service has been paid. Equally clearly, the secure mechanism must allow the postage meter to be reset or recharged with additional funds. That is, a mechanism must be provided which will allow the postage meter to print additional postage if and only if an equivalent amount has been paid to the postal service.

(Those skilled in the art will recognize that other forms of valve, e.g. tax stamps, may be dispensed by postage meter-like devices. As used herein the term "postage meter" contemplates such devices which include secure, rechargeable mechanisms for controlled dispensing of value.)

Various schemes have been devised and implemented to obtain the desired remote recharging based on information from a remote data processing center. Typical systems are shown in U.S. Pat. No.: 3,792,446, to McFiggans et al., entitled REMOTE POSTAGE METER RESETTING METHOD; and in U.S. Pat. No. 4,097,923, to Eckert, Jr. et al., entitled POSTAGE METER CHARGING SYSTEM USING AN ADVANCED MICROCOMPUTERIZED POSTAGE METER. These patents teach a data processing center which is equipped with a programmed digital computer and a voice answer-back unit to process telephone calls from users of postage meters equipped with either a combination lock such that the lock prohibits recharging of the associated meter until it is unlocked, or, in the case of U.S. Pat. No. 4,097,923, having a working memory which contains a seed number for generating postage funding combinations to unlock the meter. The remote system of the later patent includes the capability of adding variable amounts of postage to the postage meter. U.S. Pat. No. 3,792,446, relates only to the addition of fixed increments to the meter. Each of these systems is based on transmission by a postage meter user of information including, or derived from, the contents of the meter ascending and descending registers, the meter serial number, an account number to be debited for the amount of funds to be recharged, and in the case of a variable recharge system, the amount by which the meter is to be recharged. If the data processing center includes a voice answer-back system, the operator may transmit the information using DTMF tones over the telephone system or the operator may simply speak to a second operator at the data processing center to transmit the information. In either case the data processing center then provides an encrypted number which may be used to recharge the meter, as is described in the above referenced patents.

As is well know to those skilled in the art the ascending register of a postage meter is a large capacity register which is incremented by the postage amount each time the meter prints an indicia, and thus contains the total amount of postage printed by the meter over its lifetime. The descending register is decremented by the amount of postage each time an indicia is printed and incremented by the amount of funds each time the meter is recharged. The meter, of course, cannot print postage in excess of the amount of funds in the descending register. The total of the ascending and the descending register is equal to the total amount of funds with which the meter has been charged in its lifetime. (Sometimes herein referred to as the control sum.) Since the recharge code is generated using a secure algorithm and is based on information which includes the control sum and the serial number of the meter, it is apparent that each recharge of the meter will require a secure, unique recharge code.

Such recharging systems are marketed by Pitney Bowes Inc., the assignee of the subject application, under the trademark "Postage-by-Phone", and are described more fully in the above referenced patents.

In the systems described above the recharge code is entered into a postage meter, such as the Pitney Bowes Model 6900 Electronic Meter, manually through a key pad by an operator. Alternately, the information may be entered into the Model 6900 Meter through a communications port which is normally used for communication with a postal scale using a proprietary Pitney Bowes communications protocol described in U.S. Pat. No. 4,498,187; to Soderberg et al.

U.S. Pat. No. 3,255,493 to Simjian discloses a system in which the meter communicates directly to a central accounting station for accounting for each and all of the meter operations, either on a real time basis or in batches. A similar system is disclosed in West German Patent Application No.: DE 2,636,852, published Feb. 23, 1978; in which a data transmitting unit is employed to recharge the postage meter over telephone or telegraph lines. British Patent Application No.: 2,147,853, published May 22, 1985, discloses a telephone integrated with a mail franking device, which operates either as a telephone or as a postage meter. The telephone key pad may be used to recharge funds and accounting may be done either locally at the device or in a central accounting unit.

Each of the above described devices requires a complex sequence of operations to recharge a postage meter. U.S. Pat. No. 4,812,992 to Storace et al., issued Mar. 14, 1989, discloses a system which attempts to simplify the recharging process. In Patent No. 4,812,992, a novel postage meter which includes a dedicated communications port, which is preferably a DTMF transmitter/receiver for telephone communications, is connected over the telephone network to a remote data processing center, such as a Pitney Bowes "Postage-by-Phone" center. Each meter has the capability to initiate and complete a recharging transaction with the data processing center whenever its funds (i.e., the contents of its descending register) fall below a preset limit.

While effective, the system of Patent No. 4,812,992, requires the design and implementation of an entire new meter design and the approval of that meter by the US Postal Service.

Thus it is an object of the subject invention to provide a system for simply and automatically recharging an electronic postage meter.

It is a further object of the subject invention to provide such a system which is compatible with existing postage meters without the necessity of obtaining approvals from a postal service.

Other objects and advantages of the subject invention will be apparent to those skilled in the art from consideration of the attached drawings and of the detailed description set forth below.

BRIEF SUMMARY OF THE INVENTION

The above objects are achieved and the disadvantages of the prior art are overcome in accordance with the subject invention by means of an apparatus for recharging a postage meter which includes a first communications channel for communication with the postage meter, a memory for storage and retrieval of data relating to recharging of the postage meter, a second communications channel for communicating with a data processing center, and a controller. The controller first communicates through the first communications channel with the meter to obtain meter parameters. Typically the meter parameters are a function of the contents of the ascending and descending registers, i.e., the total postage expended during the life of the meter and the total funds currently available in the meter. The controller then combines the meter parameters with previously stored data to form a message, and transmits the message to the data processing center through the second communications channel. The controller then controls the apparatus to receive a message including a recharge code from the data processing center, and to retransmit that code to the meter to recharge the meter.

In accordance with one aspect of the subject invention the apparatus comprises a base unit connected to the meter, and a physically separate communications module, connectable to the base unit for communications with the meter, so that the communications module can be used to recharge a plurality of meters.

In accordance with another aspect of the subject invention the memory comprises a physically separable module for storing a portion of the information for the message, the portion including information identifying the meter and the module being connectable to the apparatus. Thus, the module acts as a key without which the apparatus cannot be used to recharge the meter.

In accordance with another aspect of the subject invention the apparatus further includes an input for input by a user of information defining the amount of funds by which the meter is to be recharged.

Thus it may be seen that the subject invention achieves the above objects and advantageously overcomes the problems of the prior wet. Other objects and advantages of the subject invention will be apparent from consideration of the attached drawings and the description set forth below.

DESCRIPTION OF THE DRAWINGS

Various aspects of the subject invention are illustrated in the following drawings wherein the identical components are shown with identical reference numbers.

FIG. 2*b*, shows a table of error condition displays for the system of FIG. 2*a*.

FIG. 2*d*, shows a table of error condition displays for the system of FIG. 2*c*.

DETAILED DESCRIPTION OF PREFERRED EMBODIMENTS OF THE INVENTION

Figure 1:
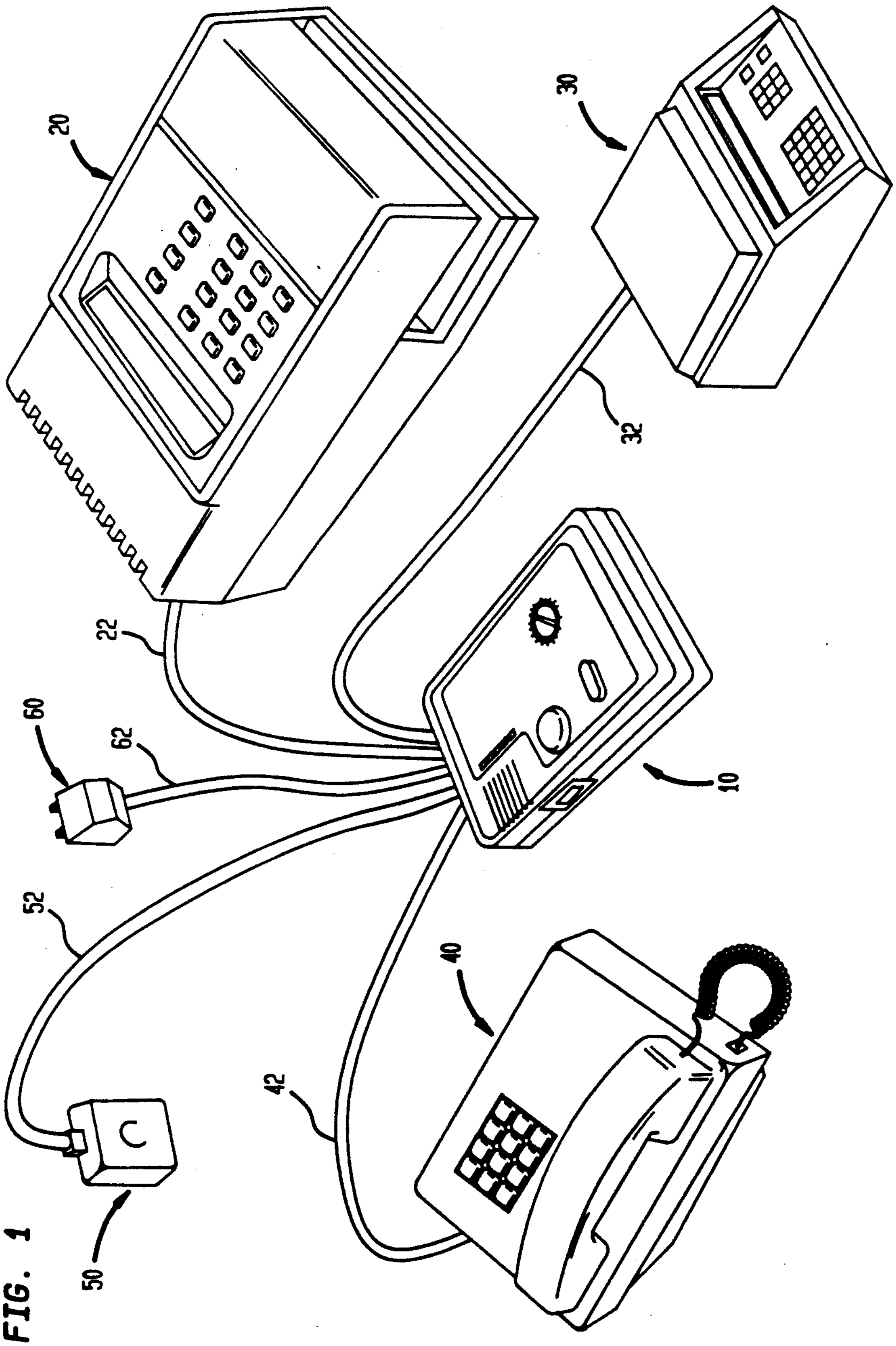
FIG. 1, shows a perspective view of a recharging system in accordance with the subject invention together with a postage meter and scale.

FIG. 1, shows a system for metering mail which includes a system in accordance with the subject invention for the automatic recharging of funds to an electronic postage meter. A preferred embodiment 10 of the system of the subject invention, is connected to the communications port of an electronic postage meter 20. Preferably meter 20 is a meter such as the Model 6900 Electronic Postage Meter, marketed by the assignee of the subject invention, Pitney Bowes Inc. The Model 6900 meter includes a communications port which operates under the proprietary protocol, commonly know as "Echoplex", described in the above referenced U.S. Pat. No. 4,498,187. Further description of the "Echoplex" protocol is not believed necessary for an understanding of the subject invention, except to note that the Model 6900 meter is designed so that any information which may be manually entered or retrieved from the meter by an operator may be electronically entered or retrieved through the "Echoplex" port.

As will be described further below, a postage scale 30 is connected through line 32 to system 10, and through line 22 to the "Echoplex" port of meter 20, so that scale 30 may be used in a conventional manner to weigh items to be mailed, compute the required postage, and set meter 20. Such operation of a postage meter with a postal scale is well know in the art and need not be described further here for an understanding of the subject invention.

Telephone set 40 may be connected to system 10 through line 42, to provide connection with the remote data processing center, or, optionally, system 10 may be directly connected to telephone jack 50 through line 52, to provide communication with the remote data processing center.

Conventional wall-mounted supply 60, may optionally be provided to generate 9 volt DC power for operation of system 10, or system 10 may be strictly battery operated.

Figure 2A:
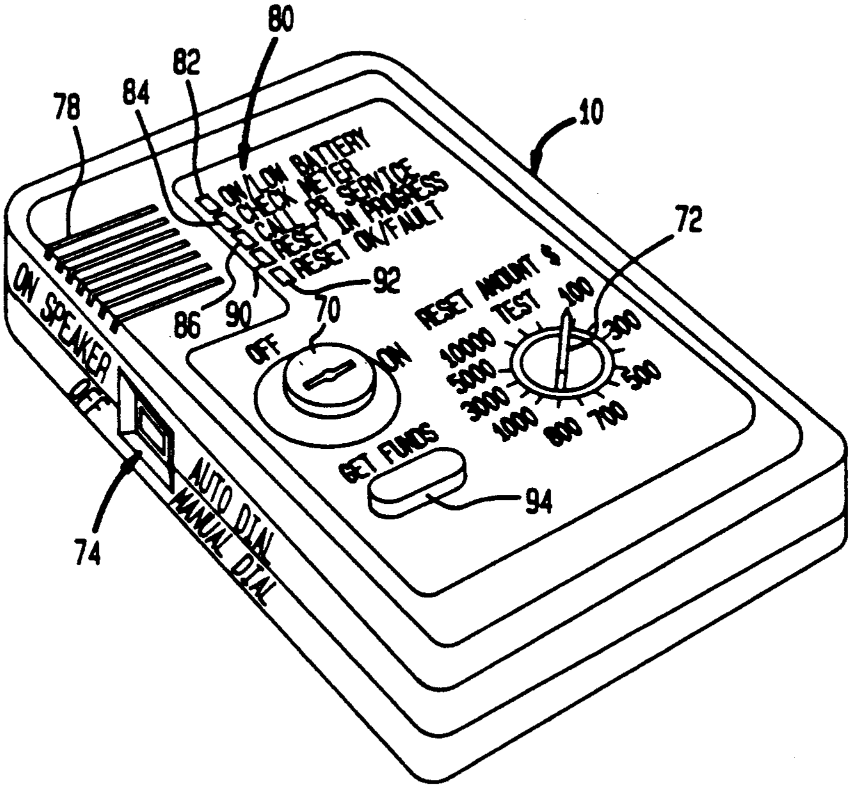
FIG. 2*a*, shows a perspective view of a version of the system of the subject invention, which is intended for permanent connection to a particular meter, and which includes a light emitting diode (LED) display.
Figure 2C:
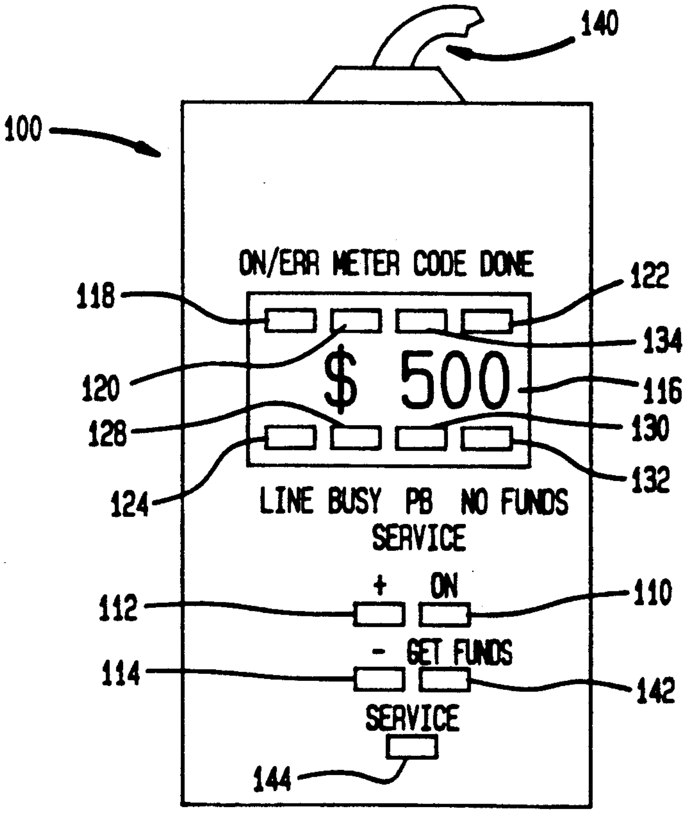
FIG. 2*c*, shows a plan view of a version of the subject invention which is intended for use with multiple meters, or in an environment where an appropriate telephone line is physically remote from meter, and which includes a liquid crystal display (LCD).

FIG. 2*a*, shows a perspective view of system 10, wherein the user interface is shown in detail. Power to system 10 is controlled through a key operated on/off switch 70, and rotary switch 72 allows the user of the system to select one of 15 dollar amounts of funds, ranging from 50 to $10,000, by which meter 20 is to be recharged. A pair of user operated switches 74, allows the user to select operation with speaker 78, which provides audio-feedback during dialing, on or off, and to select either an Auto Dial or a Manual Dial mode of operation. A linear array of light emitting diodes (LED's) 80, is provided to show the state of system 10 as shown in FIG. *2b*. LED 82, is lit when system 10 is turned on and all self tests, as will be described further below, are satisfactory, LED 82 will blink if a low battery condition is detected. LED 84 will blink if: (1) the meter registers cannot be read, or (2) A telephone line connection is not made. LED 84 will stop blinking if the error condition is corrected. LED 86 blinks to show failure of the modem self test or a communication error with the remote data processing center modem. LED 90 is lit when dialing is completed and communication with the remote data processing center is in process. LED 92 is lit to show successful completion of a recharging request, and blinks if the transaction with the remote data processing center is unsuccessfully terminated for any reason. Additionally, if rotary switch 72 is set to the Test position, and GET FUNDS switch 94 is pressed, LED's 80 will be lit together in accordance with an error code, representing the cause of the last unsuccessfully attempted transaction or abnormal condition of system 10, as shown in FIG. *2b*. Detection of such errors, both as described above with regard to system and as will be described below in regard to system 100, and the display of detected errors in terms of pre-established codes, are well understood in the communications art and no further description is believed necessary for an understanding of the subject invention.

FIG. *2c*, shows a second system 100 in accordance with the subject invention, and which is intended for use in a multiple-meter environment. In system 100 power is controlled by a push button on/off switch 11? , and the amount by which a meter is to be recharged is controlled by push button switches 112 and 114, which increment and decrement an amount displayed on liquid crystal display (LCD) 116, by a fixed amount. LCD 116, also displays indicator bars or dashes in association with labels printed on the body of system 100, to display various systems states and error conditions. Indicators 118, 120, 122, 124, 128, 130 and 132, are associated with the labels ON/Err, METER, DONE, LINE, BUSY, PB Service, and NO FUNDS. FIG. *2d*, shows these states and error conditions. Additionally, indicator 134 is lit when a recharge code is received from the remote data processing center, which is useful when system 100 is used in a detachable mode, where the system is detached from the meter and physically transported to a remote telephone line to obtain the recharging code and then physically returned to recharge the meter.

In order to provide the capability to operate in a detached mode, the connections shown in FIG. 1, have been combined into a single cable with a 12 pin connector assembly 140, so that system 100 may be readily detached and transported from meter to meter or to a physically remote telephone line. Get Funds button 142, initiates a transaction with the remote data processing center, one the appropriate recharging amount has been set using buttons 112 and 114.

Figure 3:
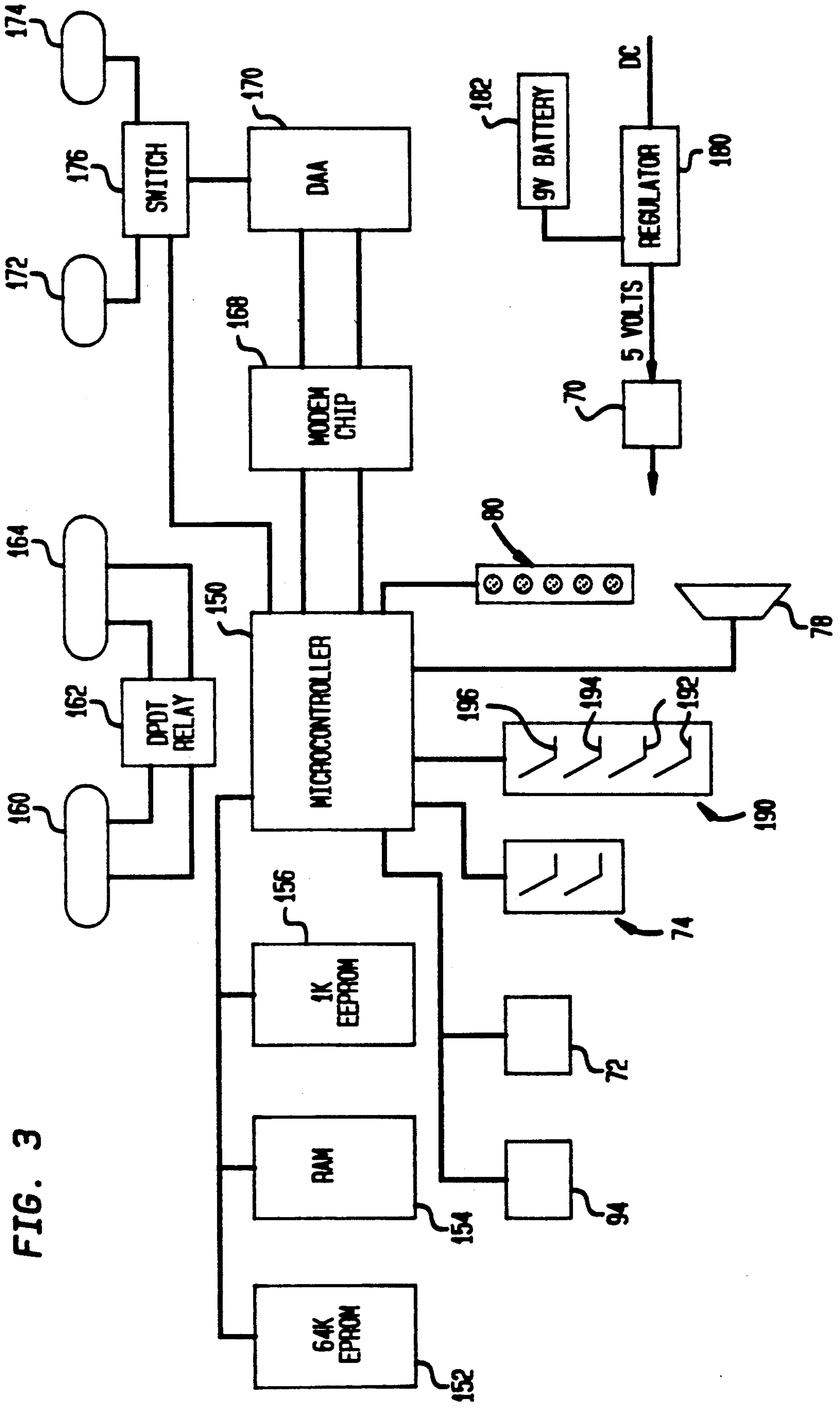
FIG. 3, shows a schematic block diagram of the system of FIG. 2*a*.

FIG. 3, shows a schematic block diagram of system 10. The system is controlled by a microcontroller 150, which is preferably a model 80C31 or 80C51. These models designators are well know, and will be readily recognized by those skilled in the art, as designating practically types of microcontrollers which are available from a number of vendors.) Memory for microcontroller 150 includes 64K bytes of electrically programmable read only memory (EPROM) 152, which stores the application program and system parameters, including up to four preassigned telephone numbers for remote data processing systems, a default account number for an account against which funds are to be charged, and a device type number to be used in an installation logon session, as will be described further below. The memory also includes 2K bytes of random access memory (RAM) 154, and 1K bytes of electrically erasable programmable ready only memory (EEPROM) 156. Memory 154 is used as working memory for microcontroller 150 and EEPROM 156 is used as semi- permanent storage for the following information: EEPROM status flag, the customer account number against which recharge funds are to be charged, the telephone number of the remote data processing center, the meter serial number, the amount by which the meter is to be recharged, the current contents of the ascending register (or an access code), the current contents of the descending register, and the recharging code. (As is well know in the art, despite its name, EEPROM's, may be erased and rewritten under control of a processor, such as microcontroller 150, and rewritten, albeit slowly. It is, in effect, non-volatile, read often, write seldom memory which is useful in applications such as that of the subject invention, where speed is not essential and security of the data is critical.)

Microcontroller 150 communicates with meter 20 through connectors 160, and a double-pole-double-throw (DPDT) relay 162. Relay 162 is controlled by microcontroller 150, so that meter 20 is normally connected through relay 162 and connector 164 to scale 30, and system 10 is only connected to meter 20 when it is to be recharged with additional funds.

Microcontroller 150 communicates with remote data processing center 600 (shown in FIG. 9) over the telephone network through modem chip 168, and data access arrangement (DAA) 170, which may be required by regulation to protect the telephone network, and connector 174, which connects directly to a telephone line, and switch 176; which preferably is controlled by microcontroller 150. A telephone can be connected to the telephone line through connectors 172 and 174 and switch 176 when system 10 is not in use, so that system 10 does not require a dedicated telephone line.

(Those skilled in the art will recognize that remote data processing centers such as that used in the Pitney Bowes "Postage-By-Phone", system, where data is normally transmitted by DTMF signals will need to be modified to receive information by modem communications techniques. Such modifications are conventional and well within the skill of those skilled in the art, and need not be described further here for an understanding of the subject invention.)

Preferably modem 16S will meet the published Bell 212 A, and CCITT V.22, standards, is capable of operating at 1200 bytes per second, full duplex, asynchronously, using the known MMP error correcting protocol class 2, and has capabilities for auto dialing, pulse or tone dialing, and dial tone, busy, ringing, and carrier detection, and will include conventional self-testing capability.

As described above the system users may input control signals through on/off switch 70, rotary switch 72, user settable switches 74 and Get Funds switch 94. Additionally, three factory settable switches 190 are provided to select one-time parameters for microcontroller 150. Two switches 192 are used to select one of four possibles countries. (i.e. specify the telephone number of the appropriate remote data processing center, the currency to be used, etc. Presently use is contemplated only in the U.S. (and Canada) or in Great Britain.) Switch 194 forces pulse dialing for factory test purposes and switch 196 forces a $1.00 reset amount for factory test purposes.

Microcontroller 150, also controls LED's 80 as described above, and controls speaker 78 to provide audio feedback during dialing.

Five volt power for system 10 is provided from regulator 180, which in turn may be driven either from 9 volt battery 182, or from optional power line 62, connected to wall-mounted power supply 60 (shown in FIG. 1).

Figure 4:
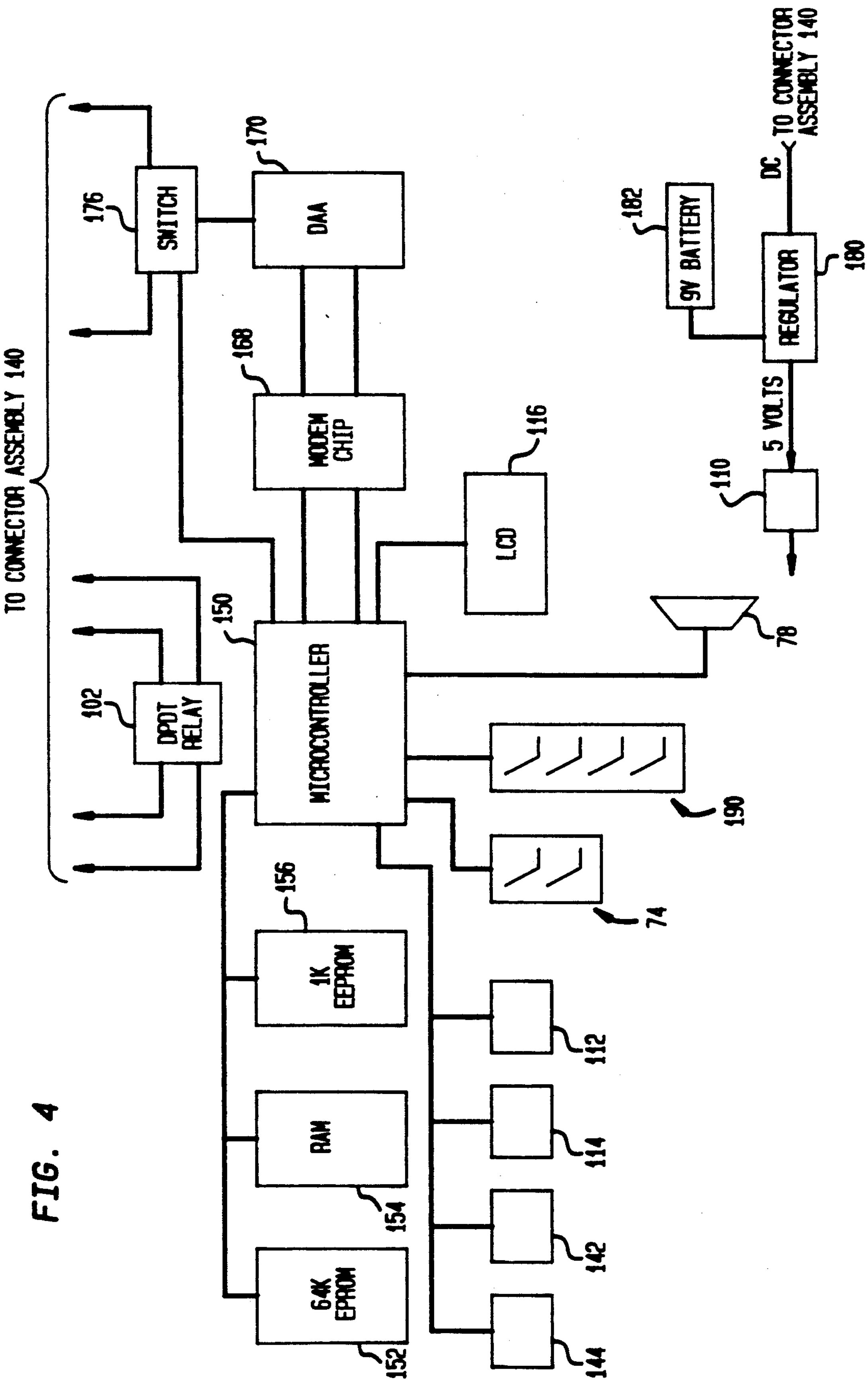
FIG. 4, shows a schematic block diagram of the system of FIG. 2*c*.

FIG. 4, is a schematic block diagram of system 100, shown in FIG. 2*b*. In FIG. 4 LCD 116, replaces LED's 80, to display the selected recharge amount and the system status or error conditions as described above. Microcontroller 150 is also connected to incremental switches 112 and 114, which cause the recharge amount displayed by LCD 116, to be incremented or decremented respectively by a predetermined amount, which allows a greater number of possible recharge amounts then the use of rotary switch 72 in system 10. On/off switch 110, and Get Funds switch 142, function in essentially the same manner as in system 10. Optionally system 100 may also include a Service switch 144 which, when activated, signals the remote data processing center to transfer the telephone line to an operator at the remote data processing center for intervention. The user may then speak directly to the operator to resolve problems. For example, if the user's account is low, it may be possible to arrange a loan so that the meter may be recharged, as will be described further below. Those skilled in the arts will of course recognize that system 100 must be connected through a phone for this to be effective, since system 100 does not include a path for voice communication. The remaining difference between system 100 and system 10 is that DPDT relay 162, switch 176 and optional power line 62 are all connected through connector assembly 140, to a base unit provided at each meter and at any remote telephone to make the connections shown in FIG. 1.

Figure 5:
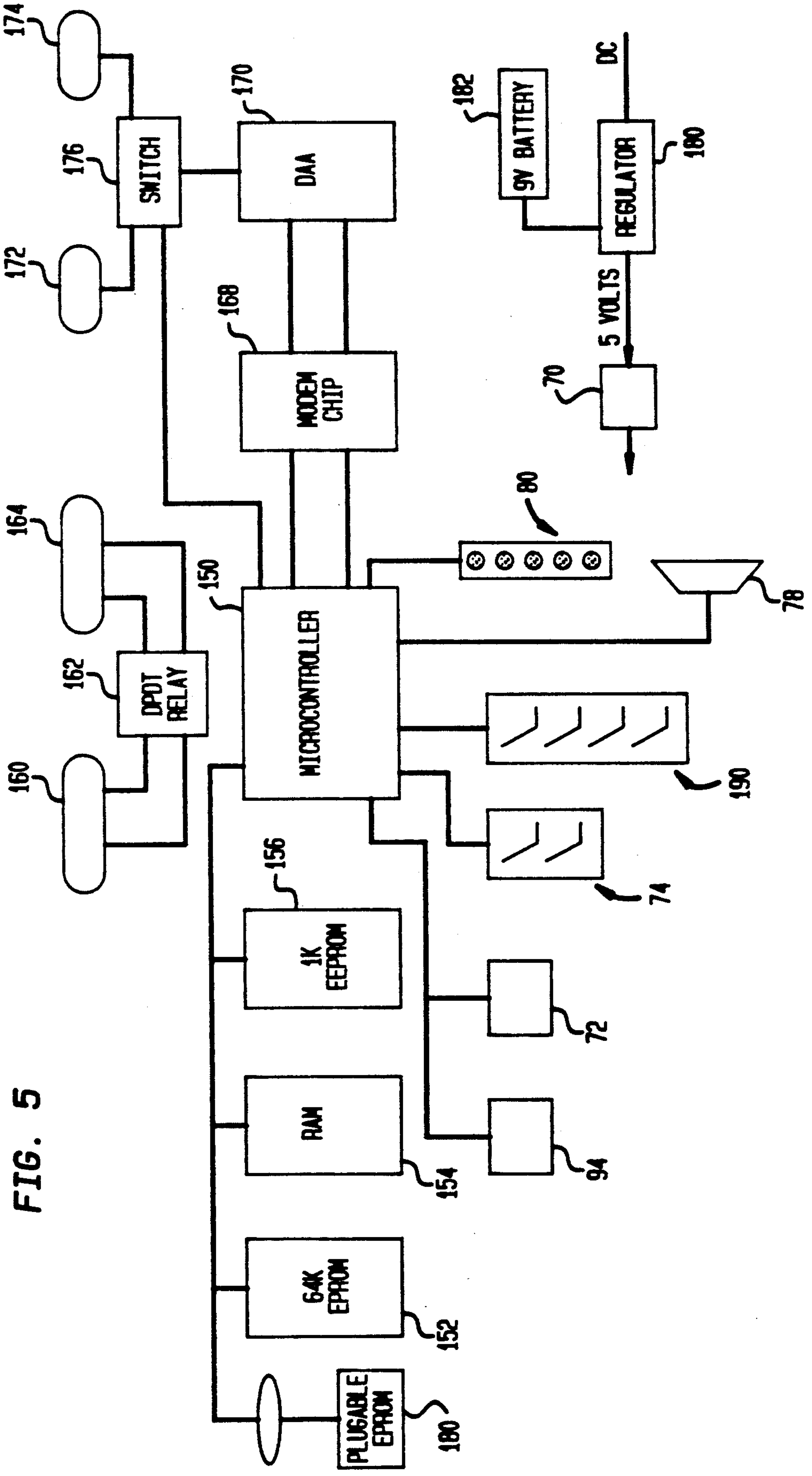
FIG. 5, shows a schematic block diagram of a variation of the system of FIG. 2*a*.

FIG. 5, is a schematic block diagram of a variation of system 10, shown in FIG. 3. In FIG. 5, an additional "pluggable" EPROM 180 is provided to store parameters for a particular meter and which are stored in EPROM 152 in the system of FIG. 3. These parameters would include the meter serial number, so that an appropriate message to the remote data processing center could not be formed without access to "pluggable" EPROM 180. Thus access to system 10 can be secured simply by control EPROM 180. Such "pluggable" EPROM's are known and include a system marketing under the trademark DATAKEY, by the Datakey Inc. of Burnsville, Minn.

Figure 6:
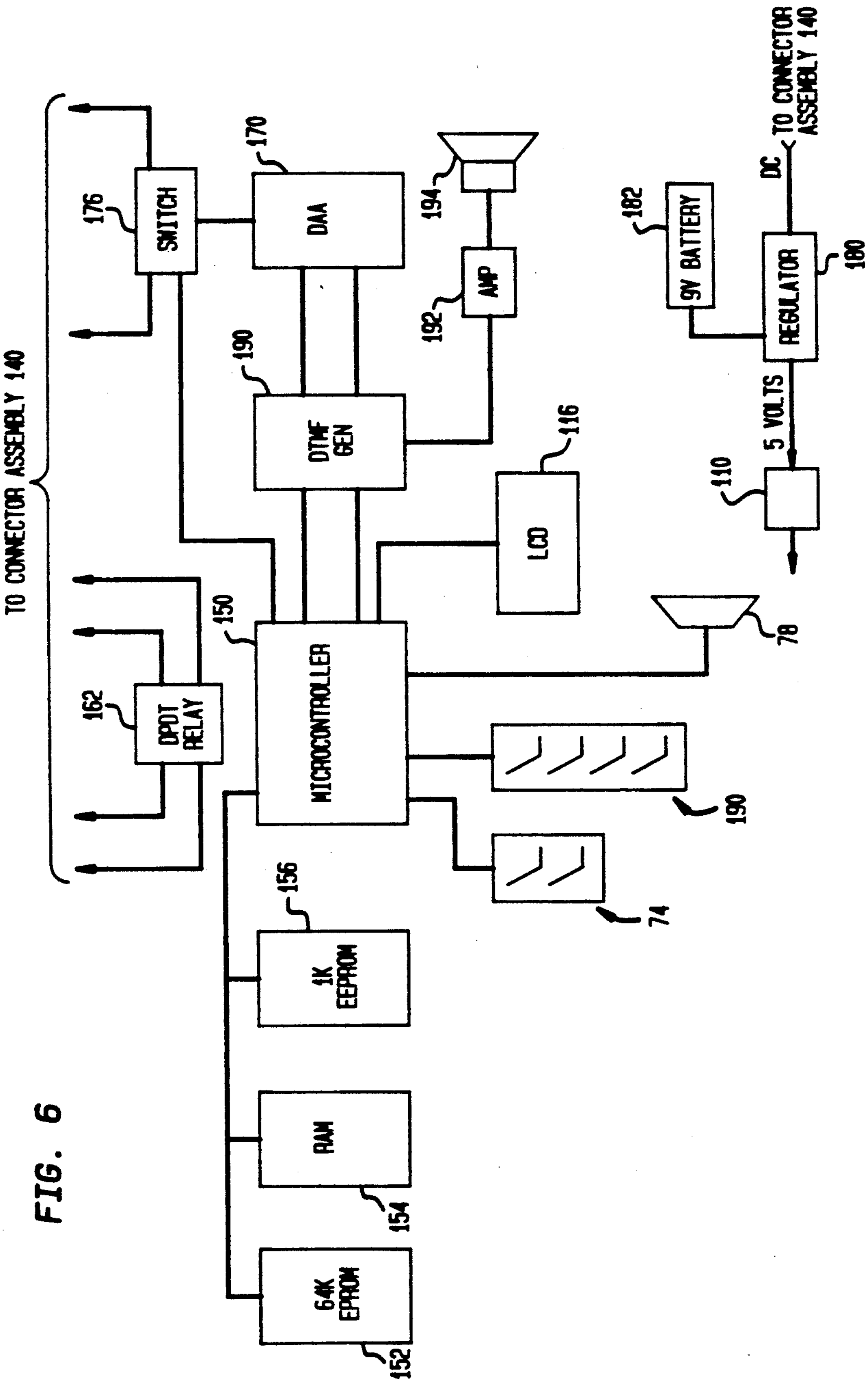
FIG. 6, shows a schematic block diagram of a variation of the system of FIG. 2*c*.

FIG. 6, shows a variation of the transportable system 100 of FIG. 4. In FIG. 6, modem 168 has been replaced by an DTMF generator 190. Thus the message to the remote data processing center is transmitted as a DTMF tone in the same manner as currently available "Postage-by-Phone" systems and little or no modification is required at the remote data processing center. Alternatively amplifier 192 and speaker 194 may be provided so that the system of FIG. 6 may be audio coupled to any telephone system for dialing and message transmission by DTMF tone. Portable telephone dialers which operate in this manner are known and our described, for example, in U.S. Pat. No. 4,293,845; to Feinberg et al. Unit 520 of FIG. 9 includes a connector 522 which mates with connector assembly 140 so that connection may be established between system 100 through connector 522 to an analog phone line 524 or through connector 526 to a telephone 528. In either case system 100 may then communicate with remote data processing center 600 through the telephone network.

Figure 7A:
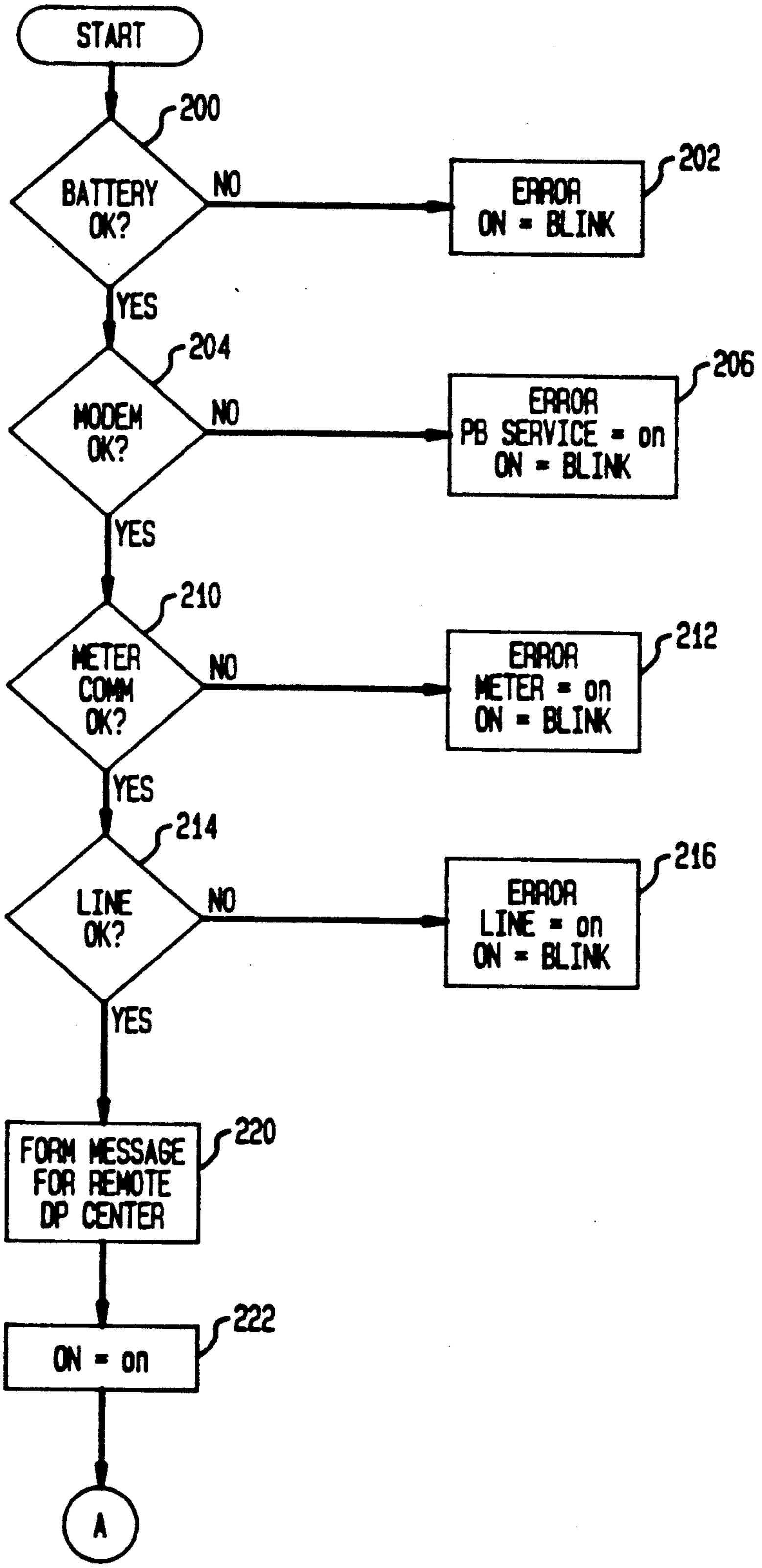
FIGS. 7*a*–7*c*, show a flow chart of the operation of the systems of FIGS. 2*a* and 3.
Figure 7B:
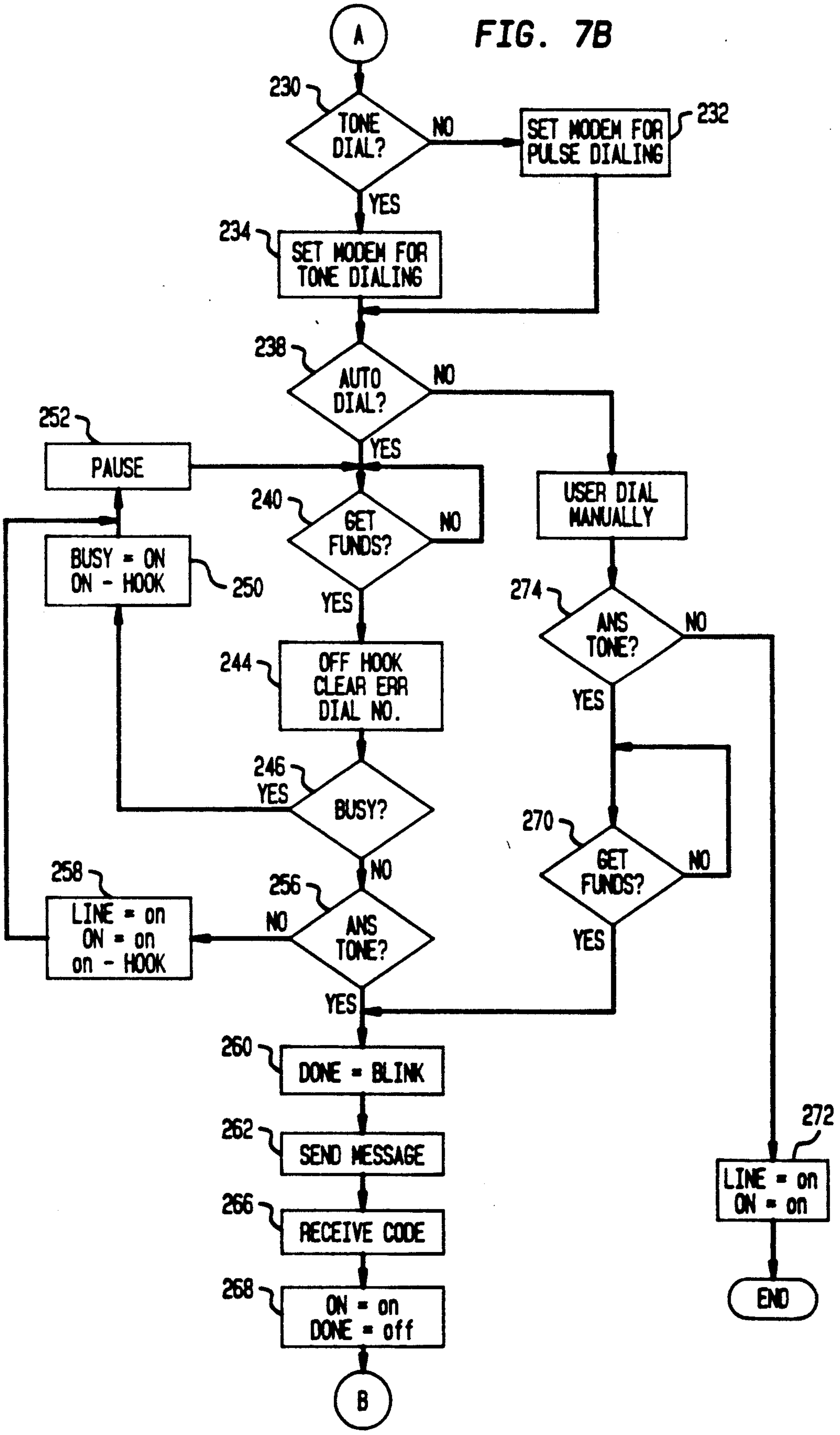
Figure 7C:
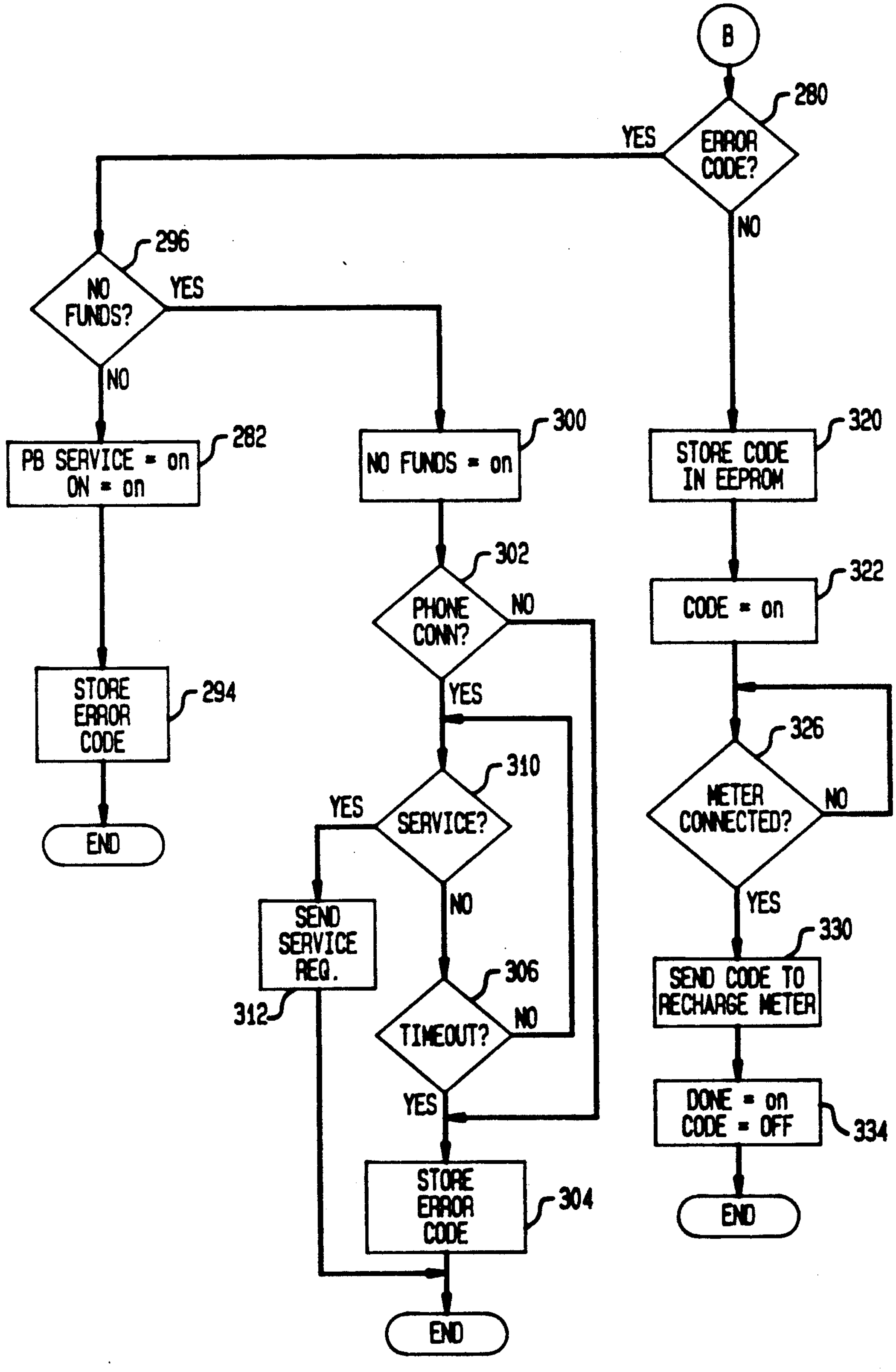

FIGS. 7*a*, 7*b* and 7*c* show a flow chart of the operation of system 100. At 200 controller 150 runs a battery test (using conventional circuitry not shown). If the test is not passed at 202 the system goes to an error state and sets ON/Err indicator 118 blinking. If the battery test is passed at 204 the system causes modem 168 to exercise its self-test. If the self test are failed at 206 the system enters and error states and sets PB service indicator 130 on and ON/Err indicator 118 blinking. If the Modem test is passed at 210 the system tests communications with meter 20 in a conventional manner. If this test is failed at 212 the system enters an Error state and sets METER indicator 120 on and ON/Err indicator 118 blinking. Finally, if the meter communications test is past at 214 system test the status of the telephone line. If this test is passed, e.g. if the line is off hook before an GET FUNDS signal is entered, the system enters an Error state at 216 and sets LINE indicator 124 on and ON/Err indicator 118 blinking.

If all tests are passed at 220 system 100 communicates with meter 20 to obtain an access code and forms a message for communication to the remote data processing center 600, in accordance with requirements for the country identified by factory settable switches 92. (Typically, in the U.S. and Canada an access code is an encryption (i.e. a secure function) of the contents of the ascending and descending registers, which is decrypted at the remote data processing center. In other countries the register contents or the control sum may be used directly. As used herein the term "access code" contemplates any function of the contents of the ascending and descending registers.) At 222 the system sets ON/Err indicator 118 on.

Continuing in FIG. 7*b*, at 230 system 100 tests switches 74 to determine if tone dialing has been selected. At 232 or 234 system 100 then sets modem 168 for appropriate dialing.

At 238 system 100 tests switches 74 to determine if auto dialing has been selected. If it has the system loops at 240 to wait for input of an GET FUNDS signal. (Even if auto dialing has been selected the user may manually dial before entering the GET FUNDS signal.) When the user enters GET FUNDS at 244 system 100 Causes modem 168 to take the telephone line off-hook, Micro-controller 150 clears any errors, and modem 168 dials the previously stored number of the remote data processing center. At 246 system 100 determines if the telephone line is busy. If it is, at 250 BUSY indicator 128 is turned on and modem 168 causes the telephone line to be placed back on-hook. At 252 system 100 pauses and then returns to 240 to allow the operator to enter another GET FUNDS signal to redial. If there is no busy signal, then at 256 the system tests to determine if an answer tone is received. If no answer tone is received at 258 LINE indicator 124 is turned on, ON/Err indicator 118 is turned on and the telephone line is placed on-hook. The system then pauses at 252 and returns to 240 to allow the user to retry.

If auto dialing is not selected then the user must manually dial remote data processing center 600 and when connection is established, as indicated by detection of an answer tone at 274, system 100 waits for a GET FUNDS signal at 270. If no answer tone is received through 272, setting LINE indicator 118 and ON/Err indicator 118 as described above.

Once connection with center 600 is established and GET FUNDS is entered, then at 260 DONE indicator 122 is set blinking, at 262 the previously formed message is transmitted to remote data processing center 600 and at 266 the system receives the recharge message from the remote data processing center. Then at 268 the system sets ON/Error indicator 118 on and DONE indicator 122 off to indicate the end of communications with the data center.

Then at 280 in FIG. 7*c* the system tests the returned message to determine if it contains an error code. If the message is an error code then at 296 a further test is made to determine if the error code indicates insufficient funds. If not at 282 system 100 turns PB service indicator 130 on and ON/Err indicator 118 on, indicating a transmission or data center procedural error.

Then at 294 system 100 stores an appropriate error code and exits.

If the returned code is a NO FUNDS code, then at 300 the system sets DONE indicator 122 on and NO FUNDS indicator 132 on. Then at 302 the system tests to determine if it is connected through a telephone set. If it is not then at 304 an appropriate error code is stored and the system exits.

If a telephone set is available then at 306 and 310 the system waits for a predetermined timeout period for a SERVICE signal. If a SERVICE signal is received before the timeout the system sends a service request to the remote data processing center which causes the remote data processing center to transfer the telephone line, using conventional telephone switching techniques, to an operator at remote data processing center 600. The user and the operator may then arrange, in accordance with appropriate procedures, for a loan which will allow the user to obtain a recharge code which will be transmitted verbally and entered manually by the user. After transferring the telephone line at 312 the system exits. If the time out occurs at 306 the system stores the appropriate error code at 304 and exits.

If there is no error and funds are available then at 320 the system stores the recharge code in EEPROM 156. At 322 CODE indicator 134 is set on and CODE indicator 134 is set on. Then at 326 the system loops to determine if it is connected to a meter. If the meter is not connected METER indicator 120 is set blinking. Once the system finds that it is connected to a meter it sends the recharge code to meter 20 to recharge the meter at 330. Then at 334 the system sets DONE indicator 122 on and the CODE indicator 134 off and exits. Note that since system 100 includes battery either as its sole or as a back-up power supply system 100 may be disconnected from meter 20 after it receives the access code without loss of data, and physically transported to a remote telephone station, and then after receiving the recharge code maybe disconnected from the telephone line and returned to the meter, since the system will not attempt to transmit the recharge code until it detects connection to meter 20.

Of course a person of ordinary skill in the art could also easily modify system 100 to store messages for a number of postage meters and receive a corresponding number of recharge codes in a single telephone transaction. This would require only that the messages be associated with the corresponding meter serial number and that the system test the meter serial number before transmitting the associated recharge code. Such modifications to the operations described above are easily within the skill of the art and may need not be described further here for an understanding of the invention.

Except for minor differences in the pattern of status and error lights displayed, fixed system 10 operates in essentially an identical manner.

Figure 8:
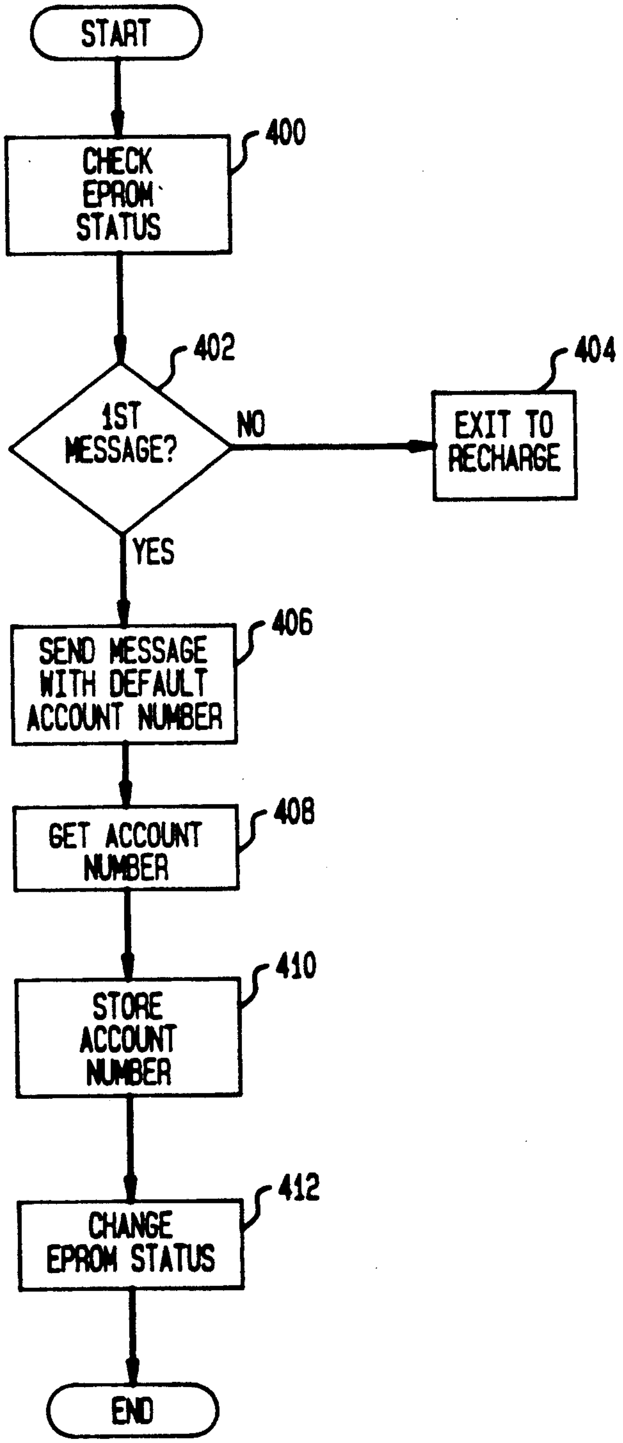
FIG. 8 shows a flow chart of the initial operation of an embodiment of the subject invention.

FIG. 8 shows operation of an embodiment of the subject invention wherein the account number against which funds are to be charged is obtained in the first transaction between the system and data processing center 600. In FIG. 8 at 400 the system checks the EEPROM status and a 402 determines if this is the first message transmitted to the data processing center. If it is not the first message then at 404 the system exits to a recharge routine as shown in FIGS. 7*a*–7*c*.

If the system determines that this is the first message then at 406 it sends a message including a default account number previously stored in EEPROM 156, which indicates to remote data processing center 600, that this message is not a request for funds but is a request for the appropriate account number for that meter serial number. Data processing center 600 response with the account number and at 408 the number is received, at 410 the account number is stored and EEPROM 156, and at 412 the system changes the EEPROM status so that all subsequent messages will be treated as a request for recharge.

In an another embodiment of the subject invention a service switch may be provided to force a first message status to allow a change of account number.

Figure 9:
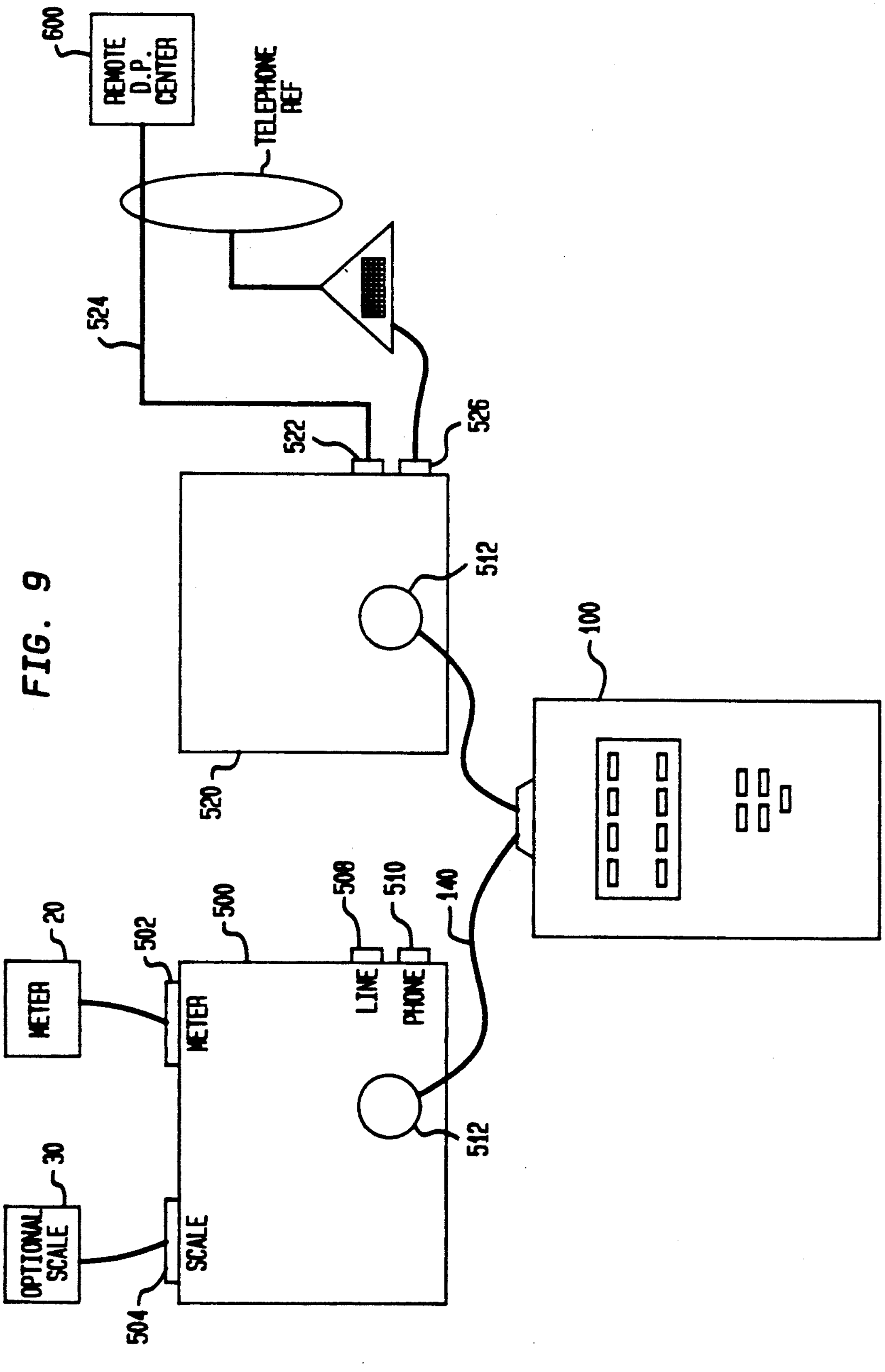
FIG. 9, shows a schematic block diagram of the use of the system of FIGS. 2*c* and 4, in an environment where an appropriate telephone line is physically remote.

FIG. 9 shows a schematic block diagram of system 100 in a configuration where communications to remote data processing center 600 are physically remote from meter 20, perhaps because an appropriate analog telephone line is not available in the mail room. Base unit 500 includes "Echoplex" connectors 502 and 504 for connection to meter 20 and optional postage scale 30. Line connection 508 and phone connection 510 are provided but are not used in this configuration. (Of course, depending upon the economies of manufacturer base unit 500 need not include connectors 508 and 510.) Meter 20 and, if provided, postage scale 30 connect through connector 512 to connector assembly 140 for communication with system 100.

When system 100 has received meter parameters from meter 20, as described above, system 100 is then disconnected from base unit 500 and physically transported to base unit 520 for connection to the telephone network. Connector assembly 140 is connected to connector 522 for connection to dedicated at telephone line 524 through connector 526 or connection through connector 528 to a telephone set for a communication through the telephone network to data processing center 600

The above description of preferred embodiments and the attached drawings have been provided by way of illustration only, and those skilled in the art will readily recognize numerous other embodiments of the subject invention from the information provided above. Accordingly, imitations on the subject invention are to be found only in the claims set forth below.

What is claimed is:

1. Apparatus for recharging a postage meter, comprising:
- a) first means for communicating with said postage meter;
- b) memory means for storage and retrieval of data relating to recharging said postage meter;
- c) second means for communicating with a remote data processing center; and
- d) control means for:
  - d1) communicating through said first communicating means with said postage meter to obtain meter parameters;
  - d2) combining an access code with data previously stored in said memory means to form a message;
  - d3) transmitting said message to said data processing center through said second communicating means;
  - d4) receiving and storing a recharge code derived from said message from said data processing center;
  - d5) communicating with said postage meter through said first communicating means to transfer said recharge code to said meter, whereby said meter is recharged;
- e) a physically separable memory module, said separable memory module storing a portion of the information comprising said message, said portion including an identification code for said meter, said recharge code being uniquely associated with said meter as a function of said identification code, whereby said separable memory module acts as a key, without which said apparatus cannot recharge said meter.

2. An apparatus as described in claim 1 wherein said separable memory module includes a user account number against which account the amount by which said meter is recharged is debited.

3. An apparatus as described in claim 1 wherein said meter parameters include an identification code for said meter, said recharge code being uniquely identified with said meter as a function of said identification code.

4. An apparatus as described in claim 1 wherein said apparatus further comprises input means for selection of an amount of funds by which said meter is to be recharged, said previously stored data comprising said amount.

5. An apparatus as described in claim 1 wherein said said message comprises different functions of said meter parameters depending on the country in which said meter is located, and said control means identifies said country and forms said message accordingly in response to the setting of settable switch means.

6. An apparatus as described in claim 1 further comprising a test switch means for setting a test mode, said control means responding to operation in said test mode to display a code representative of the cause of the last unsuccessful attempt to recharge said meter.

7. Apparatus as described in claim 1 further comprising means for generating a service signal, and wherein said second communications means includes telephone means for providing a path for voice communication, said service signal being chosen to cause said data processing center to switch said second communicating means to an operator at said data processing center.

8. Apparatus as described in claim 1 wherein said second communicating means comprises a modem.

9. Apparatus as described in claim 1 wherein said second communicating means comprises a dual tone multi-frequency generator.

10. Apparatus as described in claim 1 wherein said previously stored data includes a user account number against which the amount by which said meter is recharged is debited.

11. Apparatus as described in claim 10 wherein said control means is further for communicating with said data processing center to obtain said account number.

12. A system for recharging a plurality of postage meters, said system comprising:
- a) a plurality of base units, said plurality comprising at least one base unit connected to one of said meters and at least one base unit connected to a communications means for communicating with a remote data center;
- b) a physically separate communications module connectable to said base units comprising:
  - b1) first means for communicating with a postage meter;
  - b2) memory means for storage and retrieval of data relating to recharging said postage meters,
  - b3) second means for communicating with a remote data processing center; and,
  - b4) control means for:
    - b4.1) combining meter parameters with data previously stored in said memory means to form a message;
    - b4.2) transmitting said message to said data processing center through said second communicating means;
    - b4.3) receiving and storing a recharge code derived from said message from said data processing center; and,
    - b4.4) communicating with said postage meter through said first communicating means to transmit said recharge code to said meter, whereby said meter is recharged.

13. A system as described in claim 12 wherein a first base unit of said plurality of base units is not connected to said communications means and said communications module is separated from said first base unit after forming said message, transported to said at least one base unit connected to said communication means to transmit said message to said data processing center, then returned to said first base unit after storing said recharge code to recharge said meter.

14. A system as described in claim 13 further comprising a second base unit not connected to said communications means and said, communications module is separated from said first base unit after forming said message, transported to said second base unit to a second message, then transported to said communications form means to transmit said message and said second message to said data processing center, then successively returned to said first and second base units to recharge said meters connected to said first and second base units.

15. A system as described in claim 12 wherein said second communicating means comprises a dual tone multi-frequency generator for output of said message as a selected sequence of tones and audio coupling means responsive to said generator for audio coupling of said sequence of tones to a telephone network for transmission to said data processing center.

16. A method for recharging a postage meter comprising the steps of:

a) providing a transportable means connectable to a postage meter for communications therewith, and connectable to a telephone network for communications with a remote data processing center, for receiving, storing and transmitting data;

b) connecting said transportable means to a postage meter;

c) receiving meter parameter data from said postage meter and forming and storing a message in accordance with said meter parameter data;

d) disconnecting said transportable means from said postage meter;

e) transporting and connecting said transportable means to a telephone station, f) transmitting said message to said data processing center;

g) receiving and storing a recharge code from said data processing center;

h) disconnecting said transportable means from said telephone station;

i) transporting and connecting said transportable means to said postage meter; and j) transmitting said recharge code to said postage meter, whereby said postage meter is recharged.

17. A method as described in claim 16 wherein said transportable means includes input means for input of an amount of funds, said message is a function of said amount, and said recharge code causes said postage meter to be recharged by said amount; comprising the further step of inputting a selected amount of funds.

18. A method as described in claim 16 comprising the further steps of:

between steps d) and e):

k) connecting said transportable means to a second postage meter;

l) receiving second meter parameter data from said second postage meter and forming and storing a second message in accordance with said meter parameter data;

m) disconnecting said transportable means from said second postage meter; and between steps g) and h):

n) transmitting said second message to said data processing center, o) receiving and storing a second recharge code from said data processing; and, after step h), p) transporting and connecting said transportable means to said second postage meter, and, q) transmitting said second recharge code to said postage meter, whereby said second postage meter is recharged.

19. A method as described in claim 18 wherein said transportable means includes input means for input of an amount of funds, said message is a function of said amount, and said recharge code causes said postage meter to be recharged by said amount; comprising the further step of inputting a selected amount of funds.

* * * * *